(No Model.)
A. T. WOODWARD.
HOUSING FOR ELECTRICAL CONDUCTORS.
No. 344,764. Patented June 29, 1886.
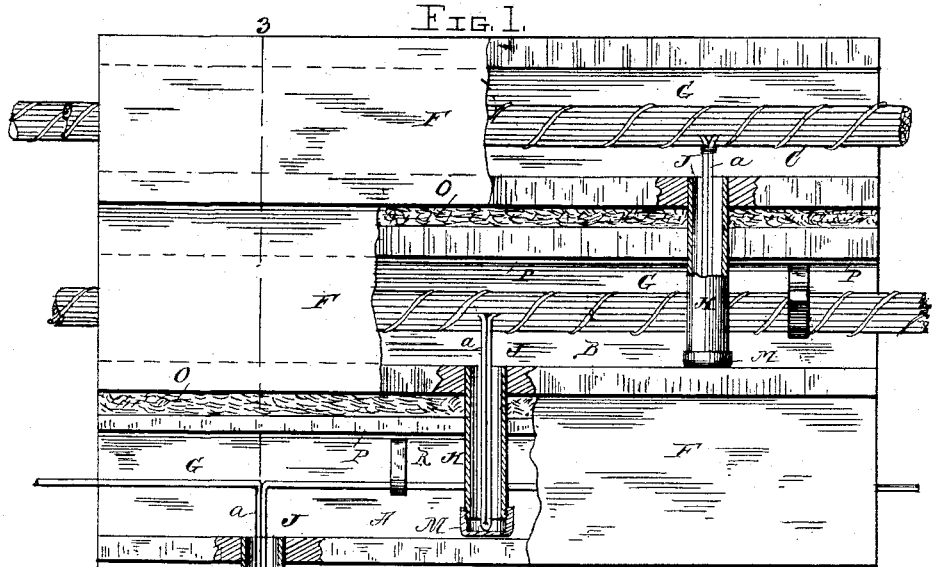
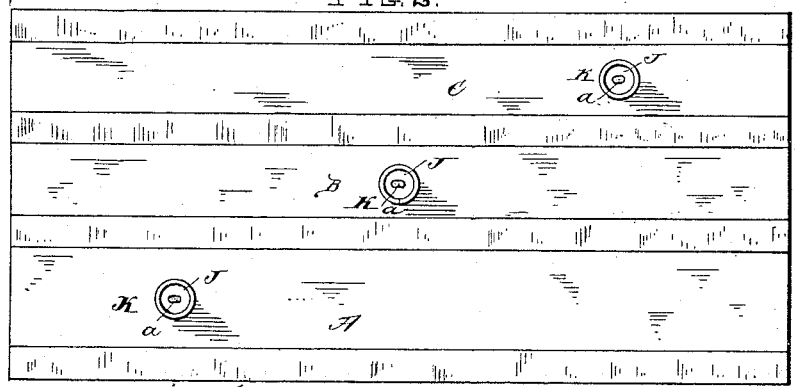
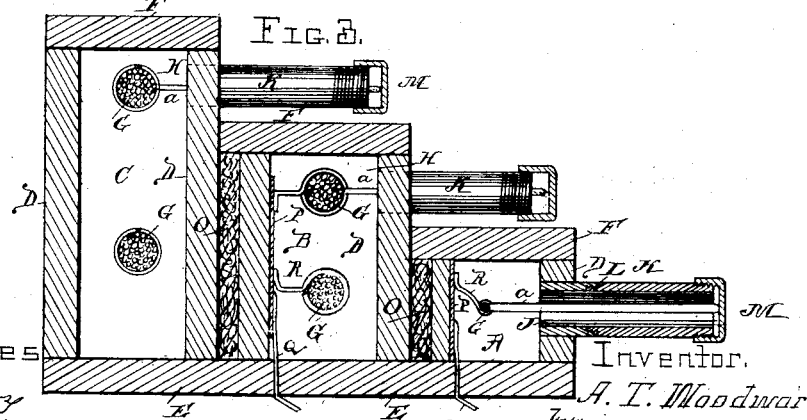
Witnesses
Inventor.
A. T. Woodward,
by Brown Bros
Attorneys

United States Patent Office.

ARTHUR T. WOODWARD, OF NEW YORK, N. Y.

HOUSING FOR ELECTRICAL CONDUCTORS.

SPECIFICATION forming part of Letters Patent No. 344,764, dated June 29, 1886.

Application filed February 8, 1886. Serial No. 191,212. (No model.)

*To all whom it may concern:*

Be it known that I, ARTHUR T. WOODWARD, of New York, in the county of New York and State of New York, have invented certain new and useful Improvements in Housings for Electric Conductors, of which the following is a full, clear, and exact description.

This invention relates to troughs, housings, or conduits for the running and inclosure of electric conductors, such as telegraph, telephone, and electric-light wires and cables.

A trough, housing, or conduit of this invention is composed of two or more separate and distinct chambers or passages, each suitable for the running of electric conductors, and each at and along its top suitably made capable of being opened and closed, for entering and running the conductors along and through them, and at and along one or both of its sides at intermediate points provided with lateral openings or ways, preferably each adapted to be opened and closed, through which to make electric connection with the electric conductor or conductors running through it, and all in a manner as to permit said lateral connection to be made with the electric conductor or conductors of either of the chambers or passages in the combination thereof, and whether the combination is of two or more, without interference with or disturbance of or passing through the other or others of the said chambers.

This invention also consists, in a housing or conduit for electric conductors, in the combination of two or more chambers or passages for running the electric conductors, and for making lateral electric connection, as above described, of a wall made of any suitable insulating material between and separating the separate chambers, for the purpose of preventing the passage of induced electric currents from the electric conductor or conductors of one chamber to those of the chamber next adjoining.

In the accompanying plate of drawings, forming a part of this specification, Figure 1 is in part a plan view, and in part a sectional view, illustrating one form in which the present improved housing for electric conductors can be carried out. Fig. 2 is a side view of Fig. 1. Fig. 3 is a transverse vertical section on line 3 3, Fig. 1.

The housing, trough, or conduit for electric conductors (shown in the drawings) is composed of three separate and distinct chambers or passages, A, B, and C, arranged alongside of each other, and of any length and size otherwise which may be desired. Each passage A B C is inclosed on all sides by side, bottom, and top walls, D, E, F, respectively. These inclosing-walls may be made of wood, metal, stone, artificial or natural, or of any other suitable material, and the top wall, F, of each passage, for convenience of entering it to run an electric conductor or conductors—such as an electric cable or cables, G—through it, is made, either in whole or in parts, removable and attachable at pleasure, and said removable top walls, F, as also all the other walls, attached together and their joints sealed in any well-known or other suitable manner.

The several passages of the trough of this invention run alongside of each other, and as to each other they are arranged for the side wall of the one to project above the top F of the one next adjoining, the upward projecting or rising portion H of the side wall, F, of each passage B C, and also the outer side wall, F, of the passage A. The lower passage of the series of passages A B C have lateral openings J made through them at suitable intermediate points, for the purpose of making, as well known, electric connection with an electric conductor which runs through such passage. Each lateral opening J preferably is provided with a tubular extension, K, into which to pass the portion *a* of the electric wire, bent or diverted from the running length of the electric conductor and on which electric connection is made, and these tubular extensions so provided may be made in separate pieces, as shown at L, Fig. 3, secured the one in the lateral opening J and the other to the one so attached, so as to enable them to be separated for the better exposure of the electric wire to the making of electric connection as desired. Each lateral opening is preferably closed with an attachable and detachable screw or other suitable cap, M.

Separate passages A B C, in a housing for electric conductors, constructed and arranged together substantially as described and shown, secure not only an independent and separate opening and closing of each passage for the running of an electric conductor or conductors through them, but also by and through the lateral openings in a side wall of each thereof, as has been described, a ready means of making electric connection with the electric conductor or conductors of either of the passages without in any way interfering with or disturbing the electric conductor or conductors of either of the other passages in the combination of passages, and without passing through such other passage or passages—obviously a very important advantage and result, and one which it is believed has never before been secured in housing for electric conductors.

As the several passages A B C are particularly shown, they are joined to and supported upon a common base. They may, however, be made separate from each other and each separately supported of itself, it being only necessary for the purpose of this invention, as to the making of lateral connections with the electric conductors of each, that, however supported, they should each present some portion of a side wall thereof for a lateral opening into the passage by and through which electric connection can be made with its conductor separately and independently of and without interference with or disturbance of either of the other passages and entering into or passing through the same.

The several passages A B C, as particularly shown, are arranged in close contact with each other, and when so arranged under this invention a wall, O, of suitable insulating material—such, for instance, as that described in the Letters Patent of the United States dated March 16, 1880, No. 225,679, and issued to me as inventor—is interposed between them, for the purpose of preventing the passage of induced electric currents from the electric conductor or conductors of one chamber—as, for instance, of chamber A to those of chamber B next adjoining and in either direction.

P is a metal plate or strip located either at intervals or continuously, as may be thought best, and secured to the inside of one of the walls of either of the passages A B C. This metal P has a wire, Q, at suitable points, making a ground-connection therewith, and also similarly a wire, R, which is connected to it and loosely surrounds the electric insulated conductor, all for the purpose of forming a means of carrying the induced electric currents of the electric conductor to the ground.

A housing made in accordance with the main feature of this invention, which, in view of the preceding description, may be now briefly stated to be one having two or more separate and distinct chambers or passages each capable of separate entrance along their top, and of lateral entrance along a side wall thereof, without interference in either case with the other, and as the same has been described in detail, and is illustrated in the drawings, furnishes three separate chambers or passages, A B C, and a very advantageous way of utilizing them is to run electric-lighting wires or conductors through the chamber A, the top of which is lowermost, telegraphic wires or conductors through the chamber B, next adjoining, and telephonic wires or conductors through the chamber C, next in order. By this utilization of the three separate chambers the electric wires or conductors requiring the greatest electric power to be exerted through them—such as the electric-light wires or conductors—and those requiring the least electric power to be exerted through them—such as the telephonic wires or conductors—are situated in the best possible relation to avoid any possibility or liability of disturbance of the lesser electric current through the telephone wires or conductors from the greater electric current through the electric-light wires or conductors.

The housing herein described is more especially intended for location under, but it may be located above, the ground; and, again, the several chambers or passages may have their respective electric conductor or conductors embedded in insulating material of any suitable kind—as, for instance, that of the patent hereinbefore referred to.

Having thus described my invention, I claim—

1. A housing composed of two or more separate chambers or passages placed side by side, rising one above another, and each presenting a side wall constructed for lateral connections to be made with its electric conductor or conductors, and without interference with the electric conductors of the other passages, substantially as described.

2. A housing composed of two or more seprate chambers or passages placed side by side, rising one above another, and each presenting a side wall constructed for lateral connections to be made with its electric conductor or conductors, and without interference with the electric conductors of the other passages, in combination with a wall of insulating material placed between and separating said passages one from another, substantially as described, for the purposes specified.

In testimony whereof I have hereunto set my hand in the presence of two subscribing witnesses.

ARTHUR T. WOODWARD.

Witnesses:
WILLIAM S. BELLOWS,
ALBERT W. BROWN.